US009349217B1

(12) United States Patent
Worley, III et al.

(10) Patent No.: US 9,349,217 B1
(45) Date of Patent: May 24, 2016

(54) INTEGRATED COMMUNITY OF AUGMENTED REALITY ENVIRONMENTS

(75) Inventors: William Spencer Worley, III, Half Moon Bay, CA (US); Edward Dietz Crump, Santa Cruz, CA (US); William Thomas Weatherford, San Mateo, CA (US); Christopher Coley, Morgan Hill, CA (US)

(73) Assignee: Amazon Technologies, Inc., Seattle, WA (US)

(*) Notice: Subject to any disclaimer, the term of this patent is extended or adjusted under 35 U.S.C. 154(b) by 206 days.

(21) Appl. No.: 13/243,634

(22) Filed: Sep. 23, 2011

(51) Int. Cl.
G09G 5/00 (2006.01)
G06T 19/00 (2011.01)

(52) U.S. Cl.
CPC .................... *G06T 19/003* (2013.01)

(58) Field of Classification Search
USPC .......................................................... 345/633
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,390,718 | B2* | 3/2013 | Robinson et al. ........ 348/333.02 |
| 2002/0080094 | A1* | 6/2002 | Biocca et al. ..................... 345/8 |
| 2008/0297589 | A1* | 12/2008 | Kurtz et al. ................ 348/14.16 |
| 2010/0157063 | A1* | 6/2010 | Basso et al. .................... 348/169 |
| 2010/0208033 | A1* | 8/2010 | Edge et al. ........................ 348/46 |
| 2010/0271394 | A1* | 10/2010 | Howard .......................... 345/633 |
| 2012/0056717 | A1* | 3/2012 | Maharbiz et al. .............. 340/8.1 |
| 2012/0081611 | A1* | 4/2012 | Tan et al. ....................... 348/584 |
| 2012/0212509 | A1* | 8/2012 | Benko et al. .................. 345/633 |
| 2012/0223885 | A1 | 9/2012 | Perez |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Xiao Wu
*Assistant Examiner* — Mohammad H Akhavannik
(74) *Attorney, Agent, or Firm* — Lee & Hayes, PLLC

(57) ABSTRACT

An architecture is provided to integrate multiple augmented reality environments to expand user experiences that might otherwise be limited in a single augmented reality environment. The architecture includes multiple augmented reality functional nodes located in separate locations to generate augmented reality environments within respective locations. The nodes are communicatively coupled together through a peer network, via cloud services, or other arrangements. The community of environments allows data, such as captured images, to be ported from one location to another, thereby allowing users to share in common experiences. Examples of such experiences might include team software coding, playing software games, virtually extending line-of-sight beyond physical boundaries, and controlling remote locations by virtually placing oneself in those locations.

20 Claims, 11 Drawing Sheets

INTEGRATED COMMUNITY OF AUGMENTED REALITY ENVIRONMENTS

BACKGROUND

Augmented reality allows interaction among users, real-world objects, and virtual or computer-generated objects and information within an augmented reality environment. Within the augmented reality environment, images may be presented on various objects and users may interact with the images and/or objects in a number of ways. These interactions may include verbal, physical, or other input signals made within a scene, such as a room or a workspace. However, augmented reality environments are commonly hosted within areas, such as rooms, which have physical boundaries, such as walls, ceilings, and floors. These physical boundaries limit the types of experiences that can be enjoyed in today's augmented reality environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor user interactions with such images. However, augmented reality environments are commonly hosted within areas, such as rooms or workspaces, which are defined by physical boundaries, such as walls, ceilings, and floors. These physical boundaries contain or otherwise limit the environment.

Described herein is an architecture that integrates multiple augmented reality environments to expand user experiences that might otherwise be limited by the physical boundaries. The architecture allows multiple environments and people within those environments to provide coordinated experiences. Examples of such experiences might include team software coding, playing software games, virtually extending line-of-sight beyond physical boundaries (e.g., seeing a baby in the next room nursery or viewing a visitor at the front door from a rear upstairs room), and controlling remote locations by virtually placing oneself in those locations (e.g., from a remote hotel, virtually walk around ones home to turn off lights or adjust heat).

The architecture may be implemented in many ways. The following disclosure first describes an illustrative environment and the components that create augmented reality environments. Subsequently, an architecture for integrating multiple environments is described, followed by several example situations where user experience is enhanced through coordinated communities of augmented reality environments. There are many possible implementations, and the following are merely representative.

Illustrative Environment

Figure 1:
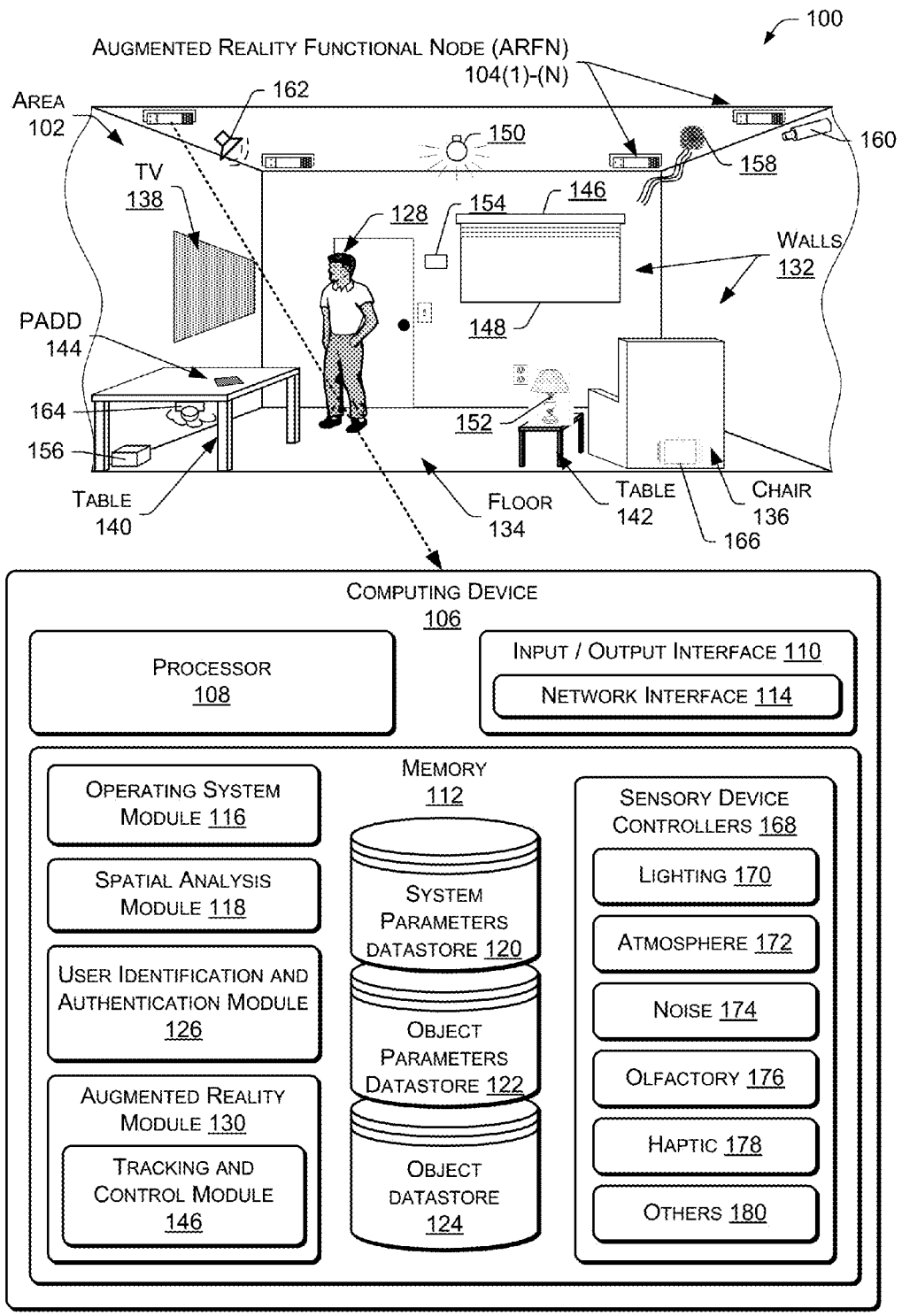
FIG. 1 shows an illustrative scene with an augmented reality environment hosted in an environmental area or volume, such as a room. The augmented reality environment is provided, in part, by an augmented reality functional node (ARFN) located in the scene and associated computing device. Secondary devices are also shown in the room to control conditions in the area.

FIG. 1 shows an illustrative augmented reality environment 100 created within a scene, and hosted within an environmental area or volume 102, which in this case is a room. Multiple augmented reality functional nodes (ARFN) 104(1)-(N) contain projectors, cameras, and computing resources that are used to generate the augmented reality environment 100. In this illustration, four ARFNs 104(1)-(4) are positioned around the scene. In other implementations, a single ARFN 104 may be used and positioned in any number of arrangements, such as on the ceiling, in a lamp, on the wall, beneath a table, and so forth. One implementation of the ARFN 104 is provided below in more detail with reference to FIG. 2.

Associated with each ARFN 104(1)-(4), or with a collection of ARFNs, is a computing device 106, which may be located within the augmented reality environment 100 or disposed at another location external to it, or event external to the area 102. Each ARFN 104 may be connected to the computing device 106 via a wired network, a wireless network, or a combination of the two. The computing device 106 has a processor 108, an input/output interface 110, and a memory 112. The processor 108 may include one or more processors configured to execute instructions. The instructions may be stored in memory 112, or in other memory accessible to the processor 108, such as storage in cloud-base resources.

The input/output interface 110 may be configured to couple the computing device 106 to other components, such as projectors, cameras, microphones, other ARFNs 104, other computing devices, and so forth. The input/output interface 110 may further include a network interface 114 that facilitates connection to a remote computing system, such as cloud computing resources. The network interface 114 enables access to one or more network types, including wired and wireless networks. More generally, the coupling between the computing device 106 and any components may be via wired technologies (e.g., wires, fiber optic cable, etc.), wireless technologies (e.g., RF, cellular, satellite, Bluetooth, etc.), or other connection technologies.

The memory 112 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 112 and configured to execute on a processor, such as the processor 108. An operating system module 116 is configured to manage hardware and services within and coupled to the computing device 106 for the benefit of other modules.

A spatial analysis module 118 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 118 provides the information used within the augmented reality environment to provide an interface between the physicality of the scene and virtual objects and information.

A system parameters datastore 120 is configured to maintain information about the state of the computing device 106, the input/output devices of the ARFN 104, and so forth. For example, system parameters may include current pan and tilt settings of the cameras and projectors. As used in this disclosure, datastore includes lists, arrays, databases, and other data structures used to provide storage and retrieval of data.

An object parameters datastore 122 in the memory 112 is configured to maintain information about the state of objects within the scene. The object parameters may include the surface contour of the object, overall reflectivity, color, and so forth. This information may be acquired from the ARFN 104, other input devices, or via manual input and stored within the object parameters datastore 122.

An object datastore 124 is configured to maintain a library of pre-loaded reference objects. This information may include assumptions about the object, dimensions, and so forth. For example, the object datastore 124 may include a reference object of a beverage can and include the assumptions that beverage cans are either held by a user or sit on a surface, and are not present on walls or ceilings. The spatial analysis module 118 may use this data maintained in the datastore 124 to test dimensional assumptions when determining the dimensions of objects within the scene. In some implementations, the object parameters in the object parameters datastore 122 may be incorporated into the object datastore 124. For example, objects in the scene which are temporally persistent, such as walls, a particular table, particular users, and so forth may be stored within the object datastore 124. The object datastore 124 may be stored on one or more of the memory of the ARFN 104, storage devices accessible on the local network, or cloud storage accessible via a wide area network.

A user identification and authentication module 126 is stored in memory 112 and executed on the processor(s) 108 to use one or more techniques to verify users within the environment 100. In this example, a user 128 is shown within the room. In one implementation, the ARFN 104 may capture an image of the user's face and the spatial analysis module 118 reconstructs 3D representations of the user's face. Rather than 3D representations, other biometric profiles may be computed, such as a face profile that includes biometric parameters such as distance between eyes, location of nose relative to eyes, etc. In such profiles, less data is used than full reconstructed 3D images. The user identification and authentication module 126 can then match the reconstructed images (or other biometric parameters) against a database of images (or parameters), which may be stored locally or remotely on a storage system or in the cloud, for purposes of authenticating the user. If a match is detected, the user is permitted to interact with the system.

In another implementation, the user identification and authentication module 126 may utilize a secondary test that involves a physical response as part of the authentication process. For instance, after analyzing a 3D reconstructed image or other biometric parameters, the user may be presented with shapes projected onto a wall or table surface. The user may be asked to pick out a pre-determined shape known to the user. Such selection may be based on hand motion or physically pointing to the shape. As another example, the secondary indicia may be a sound sequence made by the user, such as two claps followed by a finger snap. These additional indicia may be used as a further test to confirm a user identify.

In another implementation, the room may be equipped with other mechanisms used to capture one or more biometric parameters pertaining to the user, and feed this information to the user identification and authentication module 126. For instance, a scanner may be mounted on the wall or embedded in the ARFN to scan the users fingerprint, or hand profile, or retina. In other implementations, the user may use verbal input and the module 126 verifies the user through an audio profile match. In still other implementations, the use may enter a pass code via a keypad or other input mechanism within the environment 100.

An augmented reality module 130 is configured to generate augmented reality output in concert with the physical environment. The augmented reality module 130 may employ essentially any surface, object, or device within the environment 100 to interact with the user 128. In this example, the room has walls 132, a floor 134, a chair 136, a TV 138, tables 140 and 142, and a projection accessory display device 144. The accessory device 144 may be essentially any device for use within an augmented reality environment, and may be provided in several form factors, including a tablet, coaster, placemat, tablecloth, countertop, tabletop, and so forth. A projection surface on the accessory device 144 facilitates presentation of an image generated by an image projector, such as the projector that is part of an augmented reality functional node (ARFN) 104. The accessory device 144 may range from entirely non-active, non-electronic, mechanical surfaces to full functioning, full processing and electronic devices. Example accessory devices 144 are described in more detail with reference to U.S. patent application Ser. No. 12/977,949, which is entitled "Powered Augmented Reality Projection Accessory Display Device," and was filed on Dec. 23, 2010, and to U.S. patent application Ser. No. 12/977,992, which is entitled "Unpowered Augmented Reality Projection Accessory Display Device," and was filed on Dec. 23, 2010. These applications are hereby incorporated by reference.

Within the illustrated room, any object may form a part of the augmented reality environment (ARE) by, for instance, acting as a display surface upon which images may be projected. Examples of such objects include the walls 132, floor 134, and tables 140, 142, and accessory device 144. Some objects, meanwhile, may additionally or alternatively be controlled, directly or indirectly, by the system of ARFNs 102(1)-(N). For instance, the ARFNs 102(1)-(N) may utilize the television 138, speakers, or other output devices within the room for the purpose of outputting content.

Accordingly, the augmented reality module 130 may be used to track items within the environment such as those which that were previously identified by the spatial analysis module 118, and stored in the various datastores 120-124. The augmented reality module 130 includes a tracking and control module 146 configured to track one or more objects within the scene, accept inputs from or relating to the objects, and control one or more devices within environment.

The ARFNs 104 and computing components of device 106 that have described thus far may be operated to create an augmented reality environment in which images are projected onto various surfaces and items in the room, and the user 128 may interact with the images. The users' movements, voice commands, and other interactions are captured by the ARFNs 104 to facilitate user input to the environment.

As noted above, the augmented reality environment 100 is hosted within an environmental area 102, such as the room. The environmental area 102 may be described by a set of conditions—such as ambient temperature, ambient lighting, noise, and so forth—that are external to the augmented reality environment 100 being created by the ARFNs 104. In some situations, these conditions may adversely affect user experience. However, when conditions are controllably adjusted as needed, the area 102 could be selectively modified to enhance user experience while the user engages the augmented reality environment.

Accordingly, the ARFNS 104 are equipped to monitor these ambient conditions within the area 102, and in some instances control them. Conditions may be controlled by secondary devices which are external to the ARFNs that create the augmented reality environment. In the illustrated example, the room is equipped with several illustrative devices that may be used to control ambient conditions. For instance, an automated window blind 146 is provided to selectively cover or uncover a window 148 to adjust ambient lighting within the area 102. Additionally, a ceiling light 150 and a table lamp 152 may also be controllably adjusted to change ambient lighting. Other lighting apparatuses may be employed. Further, the TV 138 (or other light emitting displays) may be controlled to alter brightness, contrast, and otherwise impact viewing conditions.

An ambient temperature regulator 154 may be provided to control the room temperature. A humidity regulator 156 may be employed to control humidity within the room. An air movement mechanism 158 may be used to adjust air flow within the room. An oxygen generation or pneumatic device 160 may be used to add fresh air and/or more oxygen to the room when desired. Other devices for controlling atmospheric-related conditions may also be used.

In other implementations, a noise cancellation system 162 may be provided to reduce ambient noise that is generated by sources external to the augmented reality environment. The noise cancellation system detects sound waves and generates other waves that effectively cancel the sound waves, thereby reducing the volume level of noise. Additionally or alternatively, the ARFNs 104 may direct an audio system within the environment to add audio to the environment, such as white noise, soothing sounds (e.g., ocean waves), soothing music, or the like.

An olfactory output device 164 may be provided to modify the odor in the room. For instance, the olfactory output device 164 may controllably release fragrance into the room.

In yet another implementation, one or more haptic devices may be provided to provide tactile feedback to the user. For example, a vibration mechanism 166 may be positioned in furniture, such as chair 136, to provide tactile feedback to the user. In one example below, the vibration mechanism 166 may be used to relax the user during an augmented reality experience or used to awaken the user in an effort to keep him or her from falling asleep. However, other haptic devices may be used to provide tactile feedback, such as air engines that generate puffs of air, heat generators that produce zones of differing temperature in a space, acoustic wave generators to create non-audible acoustical waves, and so forth.

The computing device 106 has one or more controllers 168 to coordinate operation of the secondary devices to control ambient conditions within the environmental area 102. Illustrative controllers include lighting controller(s) 170 for the window blind 146, ceiling light 150, table lamp 152, and any other light affecting device. An atmosphere controller 172 is provided to control the device affecting atmosphere conditions, such as the temperature controller 154, humidity regulator 156, and pneumatic device 160. A noise controller 174 is included to control the noise cancellation system 162. An olfactory controller 176 is provided to control the olfactory output device 164 to modify smells within the room. A haptic controller 178 is provided to control the various haptic devices in the room, such as the vibration mechanism 166 in the chair 136. Other controllers 180 may also be provided to control devices used to modify any number of conditions within the environmental area 102.

These devices may be coupled to receive instructions directly from the computing device 106 via wired or wireless technologies. In some implementations, the ARFNs 104 are equipped to sense the various conditions in the area 102. The ARFNs 104 can determine when to adjust the conditions based upon whether the user's interaction with the augmented reality environment 100 will be enhanced. In other implementations, independent sensors (perhaps associated with the devices) detect the ambient conditions and provide that information to the ARFNs 104 for a determination as to whether such conditions should be adjusted given the current augmented reality environment. In yet other implementations, the ARFNs 104 may receive commands from the user in the form of voice commands, or hand/body gestures, that request the ARFNs to control some aspect of the conditions within the environmental area 102.

Assuming an adjustment is desired, the ARFN 104 may send instructions to the appropriate device to automatically make the adjustment. For instance, if the ARFN 104 decides the room temperature is too high, the ARFN 104 may direct the temperature regulator 154 to lower the temperature. If there is deemed too much light, the ARFN 104 may direct the light 150 and/or lamp 152 to dim, and/or direct the window blind 146 to partially close.

Also, in other implementations, the ARFN 104 may present instructions that ask the user or another human to make these adjustments manually, by turning down the heat or closing the window blind. For instance, the ARFN 104 may display instructions on the TV 138 or accessory device 144 for the user to follow. Alternatively, the ARFN may project an image near the specific device, where the image illustrates the action to be taken. In still another alternative, the ARFN 104 may use audible commands to tell the user what action to take.

Figure 2:
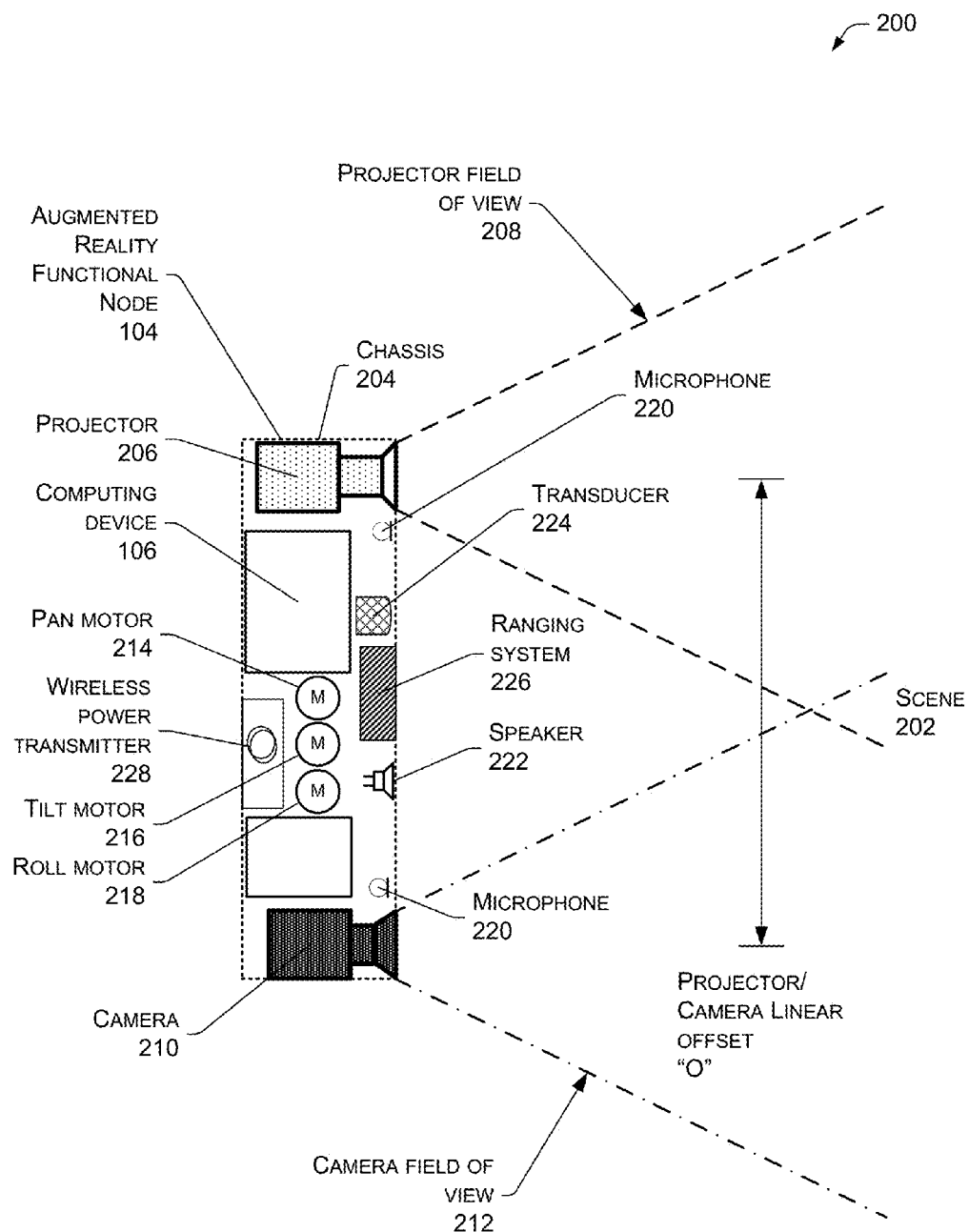
FIG. 2 shows an illustrative augmented reality functional node and computing device, along with other selected components.

FIG. 2 shows an illustrative schematic 200 of the augmented reality functional node 104 and selected components. The ARFN 104 is configured to scan at least a portion of a scene 202 and the objects therein. The ARFN 104 may also be configured to provide augmented reality output, such as images, sounds, and so forth.

A chassis 204 holds the components of the ARFN 104. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, a roll motor 218, and so forth. The pan motor 214 is configured to rotate the chassis 204 in a yawing motion, the tilt motor 216 is configured to change the pitch of the chassis 204 and the roll motor 218 is configured to rotate the chassis in a rolling motion. By panning and/or tilting the chassis 204, different views of the scene may be acquired. The spatial analysis module 118 may use the different views to monitor objects within the environment.

One or more microphones 220 may be disposed within the chassis 204, or elsewhere within the scene. These microphones 220 may be used to acquire input from the user, for echolocation, location determination of sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 220 may be used to receive voice input from the user for purposes of identifying and authenticating the user. The voice input may be received and passed to the user identification and authentication module 126 in the computing device 106 for analysis and verification.

One or more speakers 222 may also be present to provide for audible output. For example, the speakers 222 may be used to provide output from a text-to-speech module, to playback pre-recorded audio, etc.

A transducer 224 may be present within the ARFN 104, or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 104.

A ranging system 226 may also be provided in the ARFN 104 to provide distance information from the ARFN 104 to an object or set of objects. The ranging system 226 may comprise radar, light detection and ranging (LIDAR), ultrasonic ranging, stereoscopic ranging, and so forth. In some implementations, the transducer 224, the microphones 220, the speaker 222, or a combination thereof may be configured to use echolocation or echo-ranging to determine distance and spatial characteristics.

A wireless power transmitter 228 may also be present in the ARFN 104, or elsewhere within the augmented reality environment. The wireless power transmitter 228 is configured to transmit electromagnetic fields suitable for recovery by a wireless power receiver and conversion into electrical power for use by active components within the accessory device 144. The wireless power transmitter 228 may also be configured to transmit visible or non-visible light to transfer power. The wireless power transmitter 228 may utilize inductive coupling, resonant coupling, capacitive coupling, and so forth.

In this illustration, the computing device 106 is shown within the chassis 204. However, in other implementations all or a portion of the computing device 106 may be disposed in another location and coupled to the ARFN 104. This coupling may occur via wire, fiber optic cable, wirelessly, or a combination thereof. Furthermore, additional resources external to the ARFN 104 may be accessed, such as resources in another ARFN 104 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

In other implementations, the components of the ARFN 104 may be distributed in one or more locations within the environment 100. As mentioned above, microphones 220 and speakers 222 may be distributed throughout the scene. The projector 206 and the camera 210 may also be located in separate chassis 204.

Figure 3:
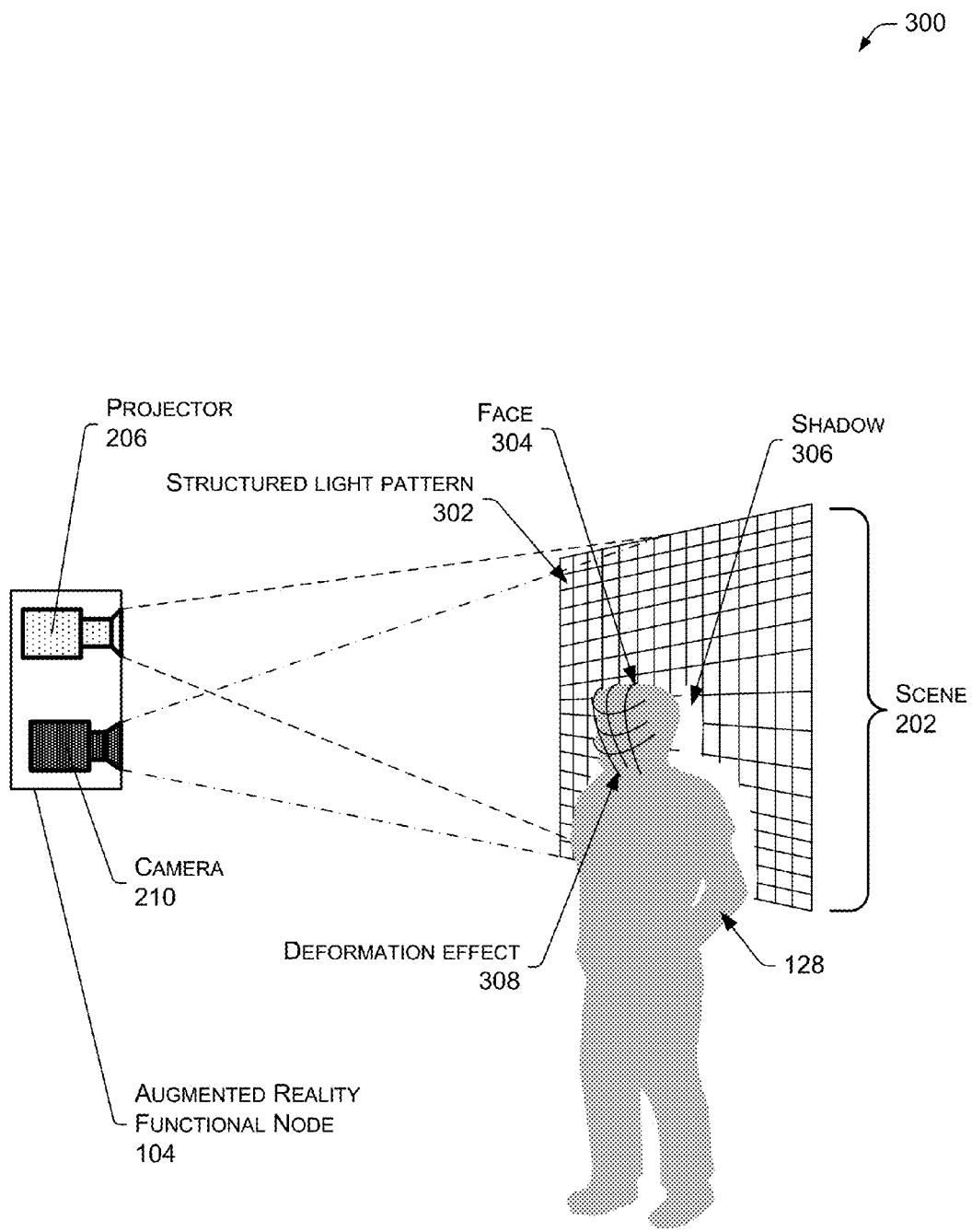
FIG. 3 illustrates the augmented reality functional node projecting a structured light pattern on a scene and capturing a corresponding image of the scene. The node may be configured to perform user identification and authentication, as well as detect orientation of the user's head or vision path.

FIG. 3 illustrates a structured light pattern 300 impinging on the scene 202. In this illustration, the projector 206 within the ARFN 104 projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom Noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 128 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 118 to characterize the scene 202. In some implementations, multiple cameras may be used to acquire the image. In other instances, the images of the user's face 304 (or other body contours, such as hand shape) may be processed by the spatial analysis module 118 to reconstruct 3D images of the user, which are then passed to the user identification and authentication module 126 for purposes of verifying the user.

In another implementation, the ARFN 104 may be used to detect orientation of the user's head and the user's line-of-sight. In some cases, the ARFN may simply deduce a likely line-of-sight based on head orientation, while in other cases, the ARFN may be configured with sufficient lenses and mechanisms to monitor eye movement or be wirelessly coupled to receive signals from a head mounted device that monitors eye movement and direction. Detecting the user's line-of-sight offers many advantages for an architecture of integrated augmented reality environments.

For example, suppose two different environments being hosted in two different rooms of a house are networked together. The user sitting in one room may be permitted to look around the second room by merely looking in the direction of the second room. The ARFN in the user room will detect head orientation, and based on that determine a line-of-sight. This information is provided to the ARFN in the second room and a 3D image of the second room is taken along the user's line-of-sight perspective. This is returned to the user's room and projected onto the appropriate wall, so that the user appears to be looking through the wall of his current room into the second room. This is just one example, and others are described below in more detail.

Certain features of objects within the scene 202 may not be readily determined based upon the geometry of the ARFN 104, shape of the objects, distance between the ARFN 104 and the objects, and so forth. As a result, the spatial analysis module 118 may be configured to make one or more assumptions about the scene, and test those assumptions to constrain the dimensions of the scene 202 and maintain the model of the scene.

Architecture of Integrated Augmented Reality Environments

Figure 4:
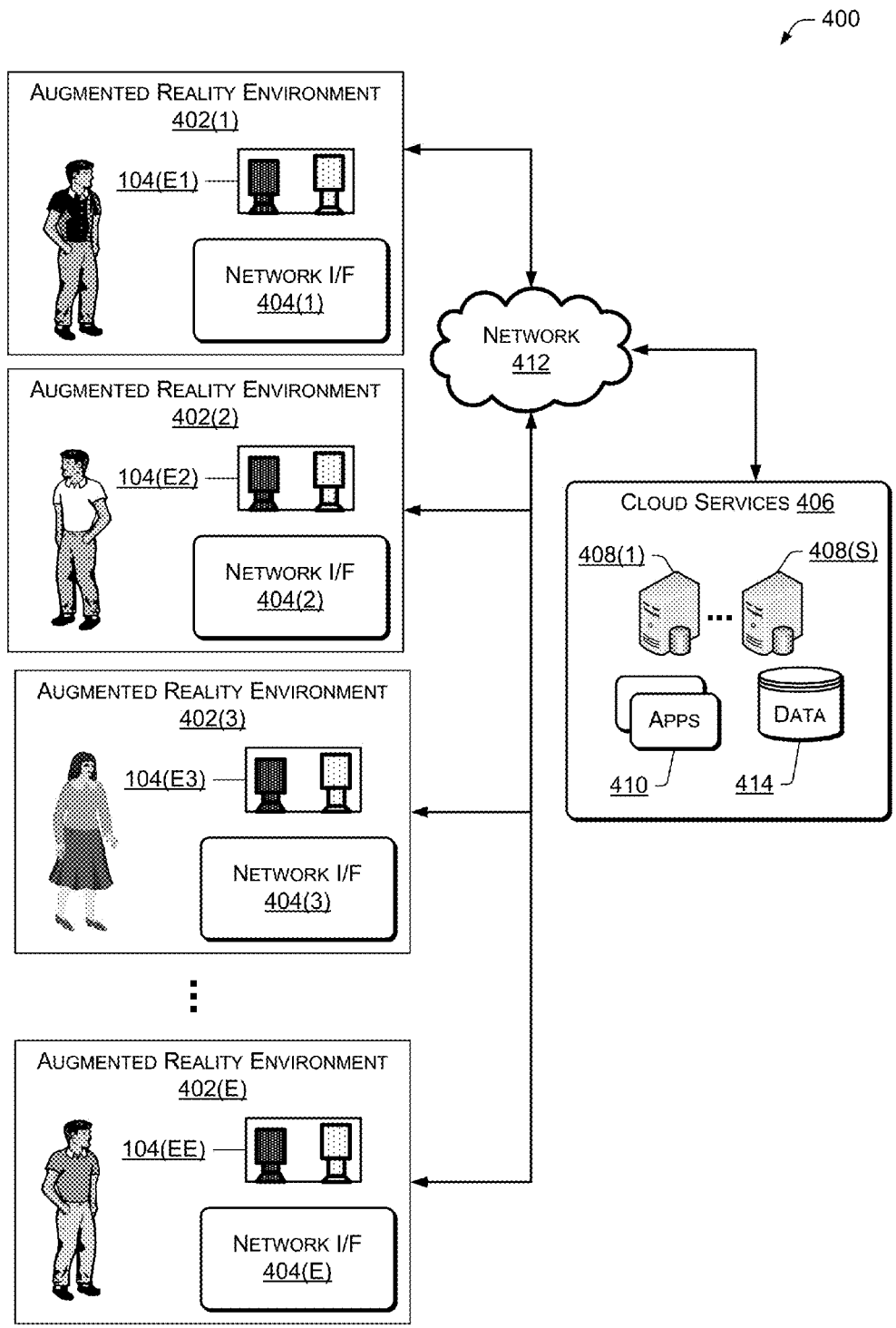
FIG. 4 illustrates an integrated community of augmented reality environments, including cloud resources to coordinate operations among the environments.

FIG. 4 illustrates an integrated community 400 of augmented reality environments. One or more augmented reality environments, as represented by environments 402(1), 402(2), 402(3), . . . 402(E), may be provided as part of the community 400. The various environments 402(1)-(E) may represent different rooms in a house or building, or different floors in a building, or rooms in different houses or buildings, or various workspaces in different geographical locations.

Individual augmented reality environments 402(1)-(E) may be configured in any number of ways. Each is equipped with one or more associated ARFNs, as represented by ARFNs 104(E1)-(EE), to generate the associated augmented reality environments 402(1)-(E). A corresponding network interface 404(1)-(E) is also provided at each augmented reality environment 402(1)-(E) to facilitate integration the cloud services 406 over a network 412.

In this arrangement, the ARFNs 104(E1)-(EE) may be integrated into a larger architecture involving the cloud services 406 to provide an even richer user experience through a community of environments 402(1)-(E). Cloud services generally refer to the computing infrastructure of processors, storage, software, data access, and so forth that is maintained and accessible via a network such as the Internet. Cloud services 406 do not require end-user knowledge of the physical location and configuration of the system that delivers the services. Common expressions associated with cloud services include "on-demand computing", "software as a service (SaaS)", "platform computing", and so forth.

As shown in FIG. 4, the cloud services 406 may include processing capabilities, as represented by servers 408(1)-(S), and storage capabilities, as represented by data storage 414. Applications 410 may be stored and executed on the servers 408(1)-(S) to provide services to requesting users over the network 412. Essentially any type of application may be executed on the cloud services 406. One possible application is a user identification and authentication application. This application receives user data from an augmented reality environment, and attempts to verify a specific user from that data. The user data may be an image of certain physical features, such as facial features captured by the local ARFN 104. The user data may be a hand profile, or a fingerprint, or a voice file, or a retina scan, or other biometric data, or a pass code. The user data may be processed against a collection of authorized user profiles stored in the data storage 414 to determine whether this particular user should be authorized. In this manner, the cloud services 406 may perform the user authentication task in addition, or as opposed, to the ARFN-resident module 126 shown in FIG. 1.

In another example of a cloud application 410, games may be hosted at the cloud services 406 and distributed for play by users in separate environments 402(1)-(E) within the community. One example of a game application is described below in more detail with respect to FIG. 5.

Another application 410 might be an application that supports virtual tours of remote locations, and control over items within the remote locations. One example of such an application is described with respect to FIG. 7, wherein a user who is current resident in a hotel uses the architecture to virtually walk around his home and adjust lighting, heating, and other controls.

Other examples of cloud services applications include sales applications, programming tools, collaboration tools, video conferencing, office productivity applications, search tools, mapping and other reference applications, media distribution, social networking, and so on.

The network 412 is representative of any number of network configurations, including wired networks (e.g., cable, fiber optic, etc.) and wireless networks (e.g., cellular, RF, satellite, etc.). Parts of the network may further be supported by local wireless technologies, such as Bluetooth, ultra-wide band radio communication, wife, and so forth.

By connecting the ARFNs 104(E1)-(EE) to the cloud services 406, the architecture 400 allows the ARFNs 104 and computing devices 106 associated with a particular environment, such as the illustrated room, to access essentially any number of services. Further, through the cloud services 406, the ARFNs in one environment may coordinate and/or cooperate with ARFNs in other environments.

Illustrative Community Experiences

The following describes several illustrative examples of multiple augmented reality environments being networked together to provide expanded user experiences that are not otherwise available in a single augmented reality environment. These examples are merely illustrative, and many others are possible.

Figure 5:
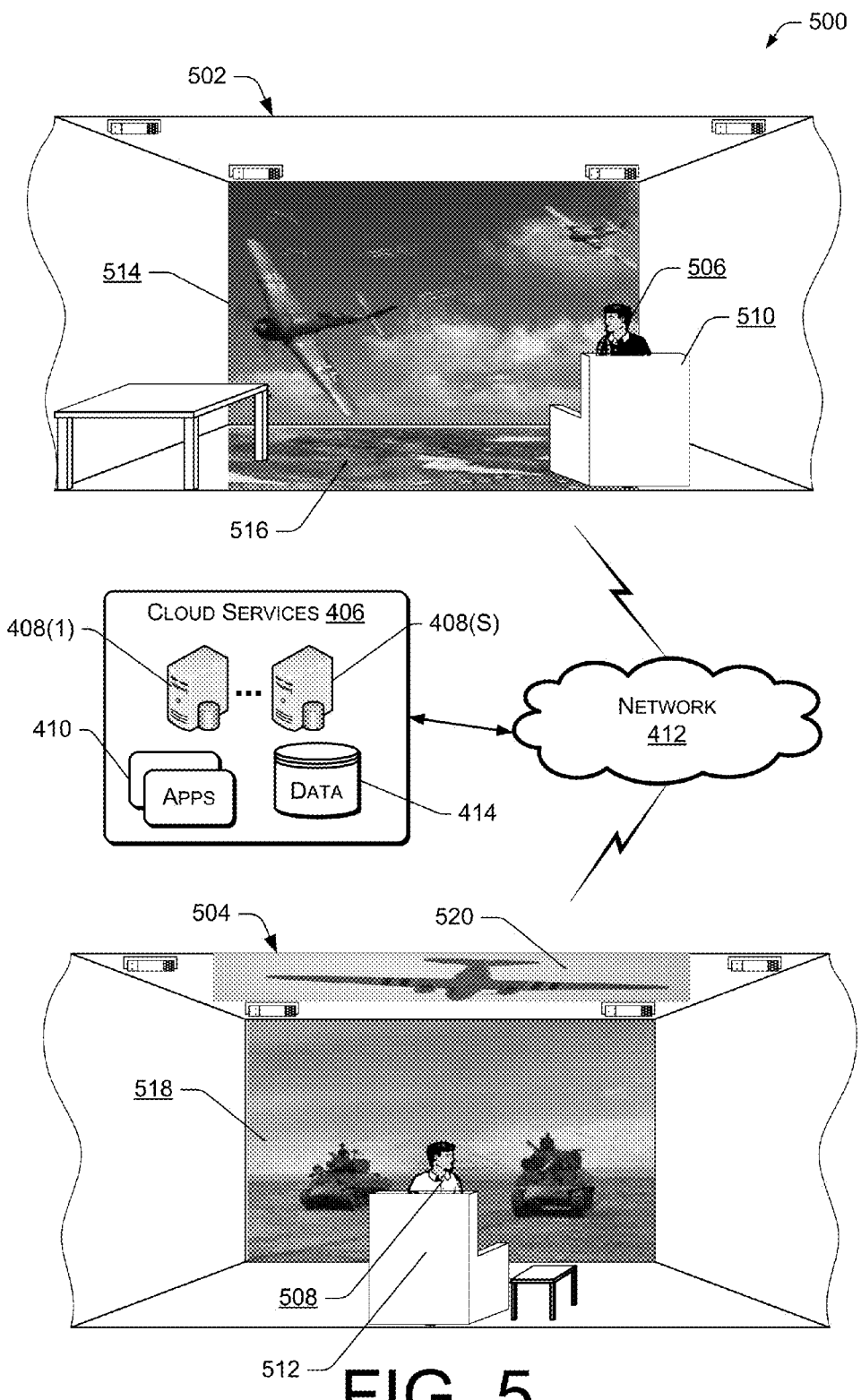
FIG. 5 shows an illustrative example of an integrated community of augmented reality environments in which users in separate environments participate in the same gaming experience.

FIG. 5 shows an integrated community 500 of two augmented reality environments 502 and 504, which are integrated through connections to the cloud services 406 via the network 412. In this example, the two augmented reality environments 502 and 504 are separate from one another (e.g., different rooms or geographical locations), but the users 506 and 508 within the environments participate in the same gaming experience. Suppose, for discussion purposes, the two users decide to play a war game involving battle scenarios set in World War II. As part of this game, the user 506 in the first augmented reality environment 502 pilots an airplane used in the battle from a pilot's seat 510, while the user 508 in the second augmented reality environment 504 drives a tank into battle from his driver's seat 512.

The ARFNs 104 in the first environment 502 create an augmented reality environment from the perspective of someone who is piloting an airplane. As shown, one or more ARFNs 104 project a first image 514 on the wall that shows other airplanes flying by in the open sky. One or more ARFNs 104 may further project a second image 516 onto the floor, wherein this second image 516 is that of a tank battle scene as if seen from the sky. In this manner, the user 506 views the battle scene from the virtual cockpit as if he were flying in a fighter plane.

Meanwhile, the ARFNs 104 in the second environment 504 create an augmented reality environment from the perspective of someone who is steering a tank. As shown, one or more ARFNs 104 project a first image 518 on the wall that shows a perspective of the battle from the ground. One or more ARFNs 104 may further project a second image 520 onto the ceiling to show planes flying overhead in the sky. In this manner, the user 508 views the battle scene from the virtual driver's seat of a tank. The merger of these augmented reality environments 502 and 504 compensate for different points of view of the two users 506 and 508, as well as potentially different capabilities of the respective augmented reality equipment in the different rooms or workspaces.

Commands may be entered by the users 506 and 508 via body motion, hand gestures, voice commands, head movement, and so on. The ARFNs detect these commands and transfer the information to the cloud services 406 as input to the game. The game processes the input and adjusts the action accordingly. These adjustments are transferred back to the ARFNs in the respective rooms for projection onto the surroundings. Furthermore, in some instances other non-illustrated ARFNs may share resources with the illustrated ARFNs to produce the augmented reality environments. For instance, ARFNs within a same home as the first environment 502 may share computing resources with the ARFNs in the illustrated environments when these other ARFNs are generally idle. Such resource sharing may increase the quality and speed of the game within the first environment 502.

Figure 6:
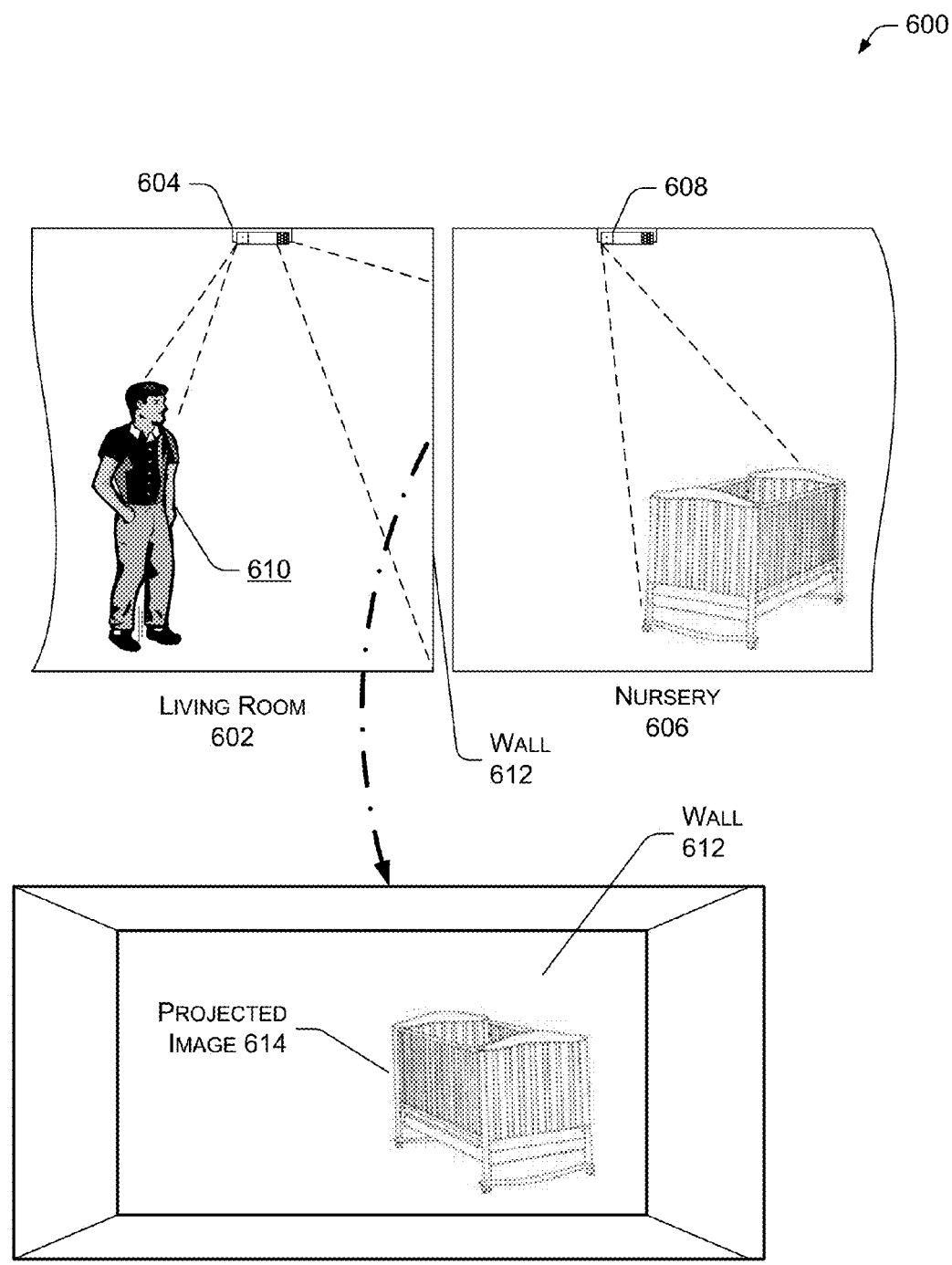
FIG. 6 shows another illustrative example of an integrated community of augmented reality environments, where environments in different rooms are coordinated to expand the visual reality of a user in one environment.

FIG. 6 shows another possible implementation of an integrated community of augmented reality environments. In this example, a community 600 of environments is formed from multiple rooms in the same home. Here, a living room 602 is equipped with one or more ARFNs, as represented by ARFN 604, to create an augmented reality environment therein. Similarly, a nursery room 606 has one or more ARFNs, as represented by ARFN 608, to generate an augmented reality environment in that room.

In this example scenario, suppose a user 610 who is standing in the living room would like to use the integrated environments to check on a baby sleeping in the nursery. A wall 612 separating the living room and nursery prevents a direct line-of-sight. The living room ARFN 604 is configured to detect head orientation of the user 610. The camera of the ARFN 602 captures an image of the user's head, and based on this image, the head orientation and the user's line-of-sight are approximated. When the user looks at the wall 612, he may then direct the system to look into the next room. This may be accomplished through a voice command, gesture, or some other movement. In response, the ARFN 604 communicates via the cloud services (or via a local area network) with the nursery ARFN 608 and sends the directional information. The nursery ARFN 608 captures an image or otherwise acquires data from the nursery from a perspective that follows the user's line-of-sight in the living room. This image from the nursery is returned to the living room ARFN 604, and projected or otherwise presented onto the wall 612 along the line-of-sight as a projected image 614.

In this manner, the user 610 looks at the wall 612, and sees the projected image 614. Due to the projected image 614, the user effectively gazes through the wall 612 as if looking directly into the nursery 606 to check on the baby without leaving the living room. Accordingly, the integrated environments allow users to extend their augmented reality beyond the confines of the environmental area 102.

As discussed above and as illustrated in FIG. 6, the ARFN 604 may project the image 614 in accordance with a line-of-sight of the user 610. That is, the ARFN 604 may project the image in such a manner that the illustrated crib is projected onto the wall in the same orientation as it would be appear to the user 610 if the wall 612 did not exist. As such, the user 610 is able to view the crib as if he was in the nursery itself.

In other instances, however, the ARFN 604 may project the image 614 in other manners. For instance, the ARFN 604 may project the image in an orientation that is different than the object would appear in the user's direct line-of-sight. To illustrate, envision that the user 610 was standing in a room underneath (i.e., one story below) the nursery 606 and that user 610 wished to check on the baby in the illustrated crib. To do so, the user may request (e.g., via a gesture, voice command, etc.) that the ARFN within the user's room project an image of the crib in the nursery 606. However, rather than project an image of the underside of the crib on the ceiling of the user's room—as would be the direct line-of-sight of the user 610 from his room underneath the nursery 606—the ARFN may project a top isometric view of the crib (as captured by the ARFN 608) on a wall in the room of the user 610.

By doing so, the user 610 is able to see whether or not the baby within the crib is awake or sleeping, rather than simply viewing the underside of the crib.

This is just one example. Many others are possible. For instance, the same integration may be used to see other non-contiguous rooms, gaze through floors or ceilings, view other floors in a building, and so on.

Figure 7:
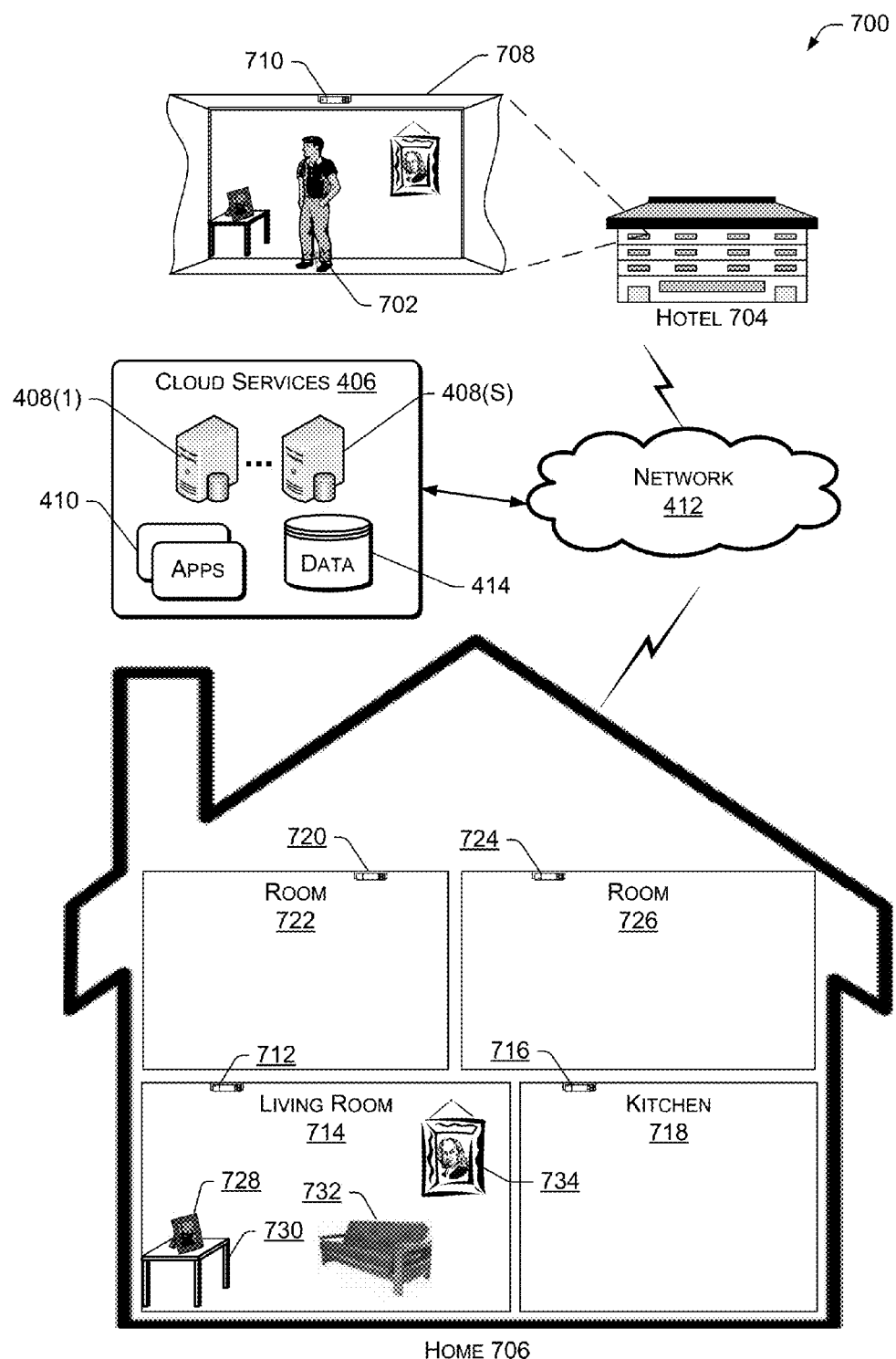
FIG. 7 shows yet another illustrative example of an integrated community of augmented reality environments. In this example, a user residing at a remote location (e.g., hotel) can leverage networked augmented reality environments to virtually walk through his house and change conditions.

FIG. 7 shows another illustrative example of an integrated community 700 of augmented reality environments that enables virtual presence in remote environments. To illustrate one possible scenario, suppose a user 702 is currently located at a hotel 704 that is remote from his home 706. While residing within a hotel room 708 at the hotel, the user 702 may desire to surround himself with images or sounds from his home 706. Additionally or alternatively, the user 702 may desire to control certain settings of his home 706 while he is away (e.g., a thermostat in the home 706, lights, etc.). To enable this scenario, the hotel room 708 is equipped with an ARFN 710 that is capable of receiving input from the user 702 to acquire and project images from the user's home, as well as to execute an application for remotely controlling activity at the home 706. The application may be executed as one of the cloud applications 410 residing the cloud services 406. The ARFN 710 is coupled to the cloud services via the network 412.

In addition, one or more ARFNs are positioned in one or more rooms of the user's home 706, as represented by ARFN 712 in the living room 714, an ARFN 716 in the kitchen 718, an ARFN 720 in a first upstairs room 722, and an ARFN 724 in a second upstairs room 726. The cloud services 406 are also coupled to the home-based ARFNs 712, 716, 720, and 724 via the network 412.

When the remote virtual application is executed, the user 710 may elect to start in a predetermined location in his home, such as the living room 714. The ARFN 712 captures an image of the living room, including the objects therein such as the picture frame 728, table 730, couch 732, and wall hanging 734. The captured image is transferred via the cloud services to the ARFN 710 in the hotel room 708, where it can be projected onto the surroundings in the hotel room. In addition to visual content, the ARFN 712 (or other ARFNs within the home 706) may capture audio or video content within the home 706 and may provide this content to the ARFN 710 for output in the hotel room 708. For instance, the ARFN 712 may capture audio and/or video of kids of the user 710 playing in the home 706 and may provide this audio and/or video to the ARFN 710 (directly or via the cloud services 406). The ARFN 710 may then project the video and/or output the audio within the hotel room 708, giving the user 702 an even greater sense of being in his home environment.

In some implementations, the ARFN 710 projects some of the images of objects from the living room 714 onto surfaces of the hotel room 708, while refraining from projecting images of other objects. For instance, the ARFN 710 may project decorative objects (e.g., the picture frame 728, the wall hanging 730, etc.) while refraining from projecting functional objects (e.g., the couch 732, televisions, lamps, etc.). In still other instances, the ARFN 710, the ARFN 712, and/or the cloud services 406 may identify each object within the living room 714, may compare these objects to objects within the hotel room 708 to identify duplicative objects, and may project within the hotel room each object that is not duplicative while refraining from projecting duplicative objects. For instance, the ARFN(s) and/or the cloud services 406 may determine that the hotel room already includes a couch and a television and, hence, may refrain from projecting, within the hotel room 708, the couch 728 and any television from the living room 714.

In any of the examples above, the ARFN 710 may project images onto any surface within the hotel room 708. In the illustrated example, part of that image is shown projected onto the wall, although parts of the image may be projected onto other objects in the room so that the hotel room at least partially replicates the user's living room. In this setting, the user may move about his hotel room and feel as though he is moving about his living room.

In addition, the user 702 may be able to control secondary devices within his living room 714 from the hotel room 708 in some instances. For instance, the ARFN 710 may project device controls from the user's living room 714 into the hotel room 708, such as light switches, a thermostat, or the like. The user may then make gestures to turn off the lights or adjust the room temperature which is captured by the hotel room ARFN 710 and transferred to the cloud services 406, which in turn directs one or more secondary devices (see FIG. 1) to make the desired adjustments. For instance, the user may perform a gesture in the form of turning off a light switch. A camera of the ARFN 710 may detect this gesture and provide an instruction to the ARFN 712 (directly or via the cloud services 406) to turn off a light within the living room 714 associated with this switch. With these techniques, the user 710 is thus able to control devices within the user's home 706 from a remote hotel room 708.

Again, this is just one scenario in which a user may extend his environment beyond the confines of the room to a remote location. Other types of scenarios may be supported by the integrated environments.

Illustrative Processes

Figure 8:
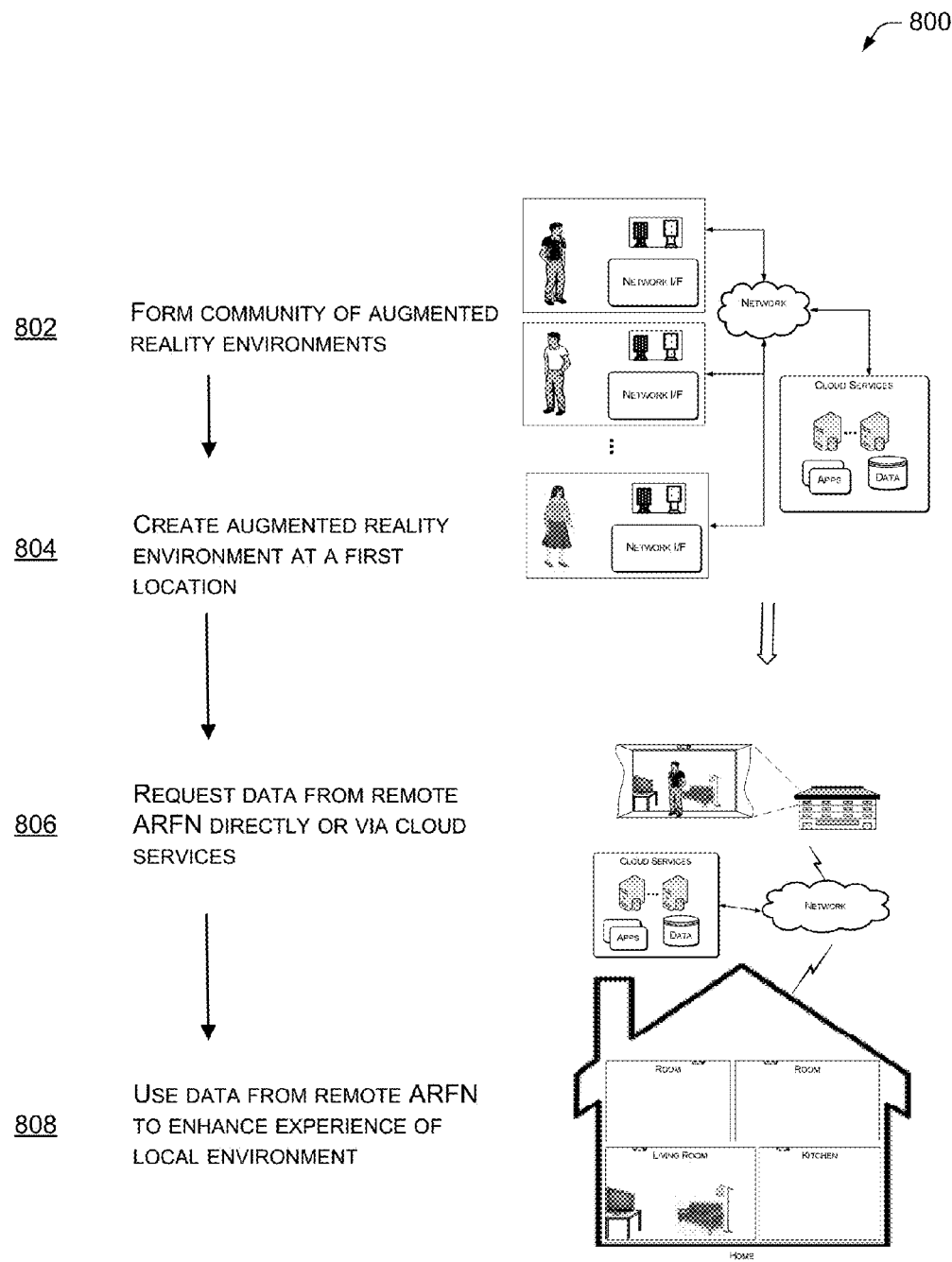
FIG. 8 shows an illustrative process of forming a community of augmented reality environments so that multiple users in different environments may have enhanced and/or shared experiences.

FIG. 8 shows an illustrative process 800 of forming a community of augmented reality environments so that multiple users in different environments may have enhanced and/or shared experiences. The processes described may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 802, a community of augmented reality environments is formed. In one implementation, individual ARFNs are registered with a central authority, such as the cloud services 406. This may be accomplished by connecting the ARFNs to a network, and executing a self-registration operation, or having the cloud services 406 attempt to discover new ARFNs. In other implementations, the ARFNs may simply communicate with one another to inform others of their existence, akin to a peer-to-peer arrangement.

At 804, an augmented reality environment is created at a first location. The augmented reality environment is generated through a combined use of projection and camera resources in which projectors project images onto surroundings that define the environment and cameras monitor user interactions with such images. In one implementation described herein, the augmented reality environment is created by one or more ARFNs 104 and associated computing device 106.

At 806, one ARFN used to create the augmented reality environment at the first location requests data captured by an ARFN used to create a second augmented reality environment at a second location. The first ARFN may contact the second ARFN directly, or via the cloud services. The first ARFN may request any type of data that would help create an enhanced experience in the first augmented reality environment. Examples of such data may be images or audio captured by the second ARFN of the environment, player input to game situations, orientation and layout of objects in an area, environmental conditions within the environment (e.g., air flow, scents, etc.), and so on.

At 808, the requesting ARFN uses the requested data to enhance experience of the locally generated augmented reality environment. For instance, the images received from the remote ARFN may be projected in the local space to create a new scene in the environment. Additionally or alternatively, the audio received by be output within the environment. In some instances, the outputted audio may be directional such that the audio mimics a directionality of the audio captured at the other environment. That is, if the user within the second augmented reality environment spoke from a back-left corner of the room, the first ARFN may output the audio from the back-left corner of the first environment to mimic the sound at the original location.

Furthermore, in some instances the environmental conditions requested from and identified at the second location may be reproduced in the first environment. For instance, in instances where the requested data comprises a scent within the second environment, the ARFN at the first environment may infuse that same scent within the first environment. Similarly, in instances where the requested data comprises an air flow, temperature, or the like within the second environment, the ARFN at the first environment may replicate the environmental conditions from the second environment at the first environment.

Figure 9:
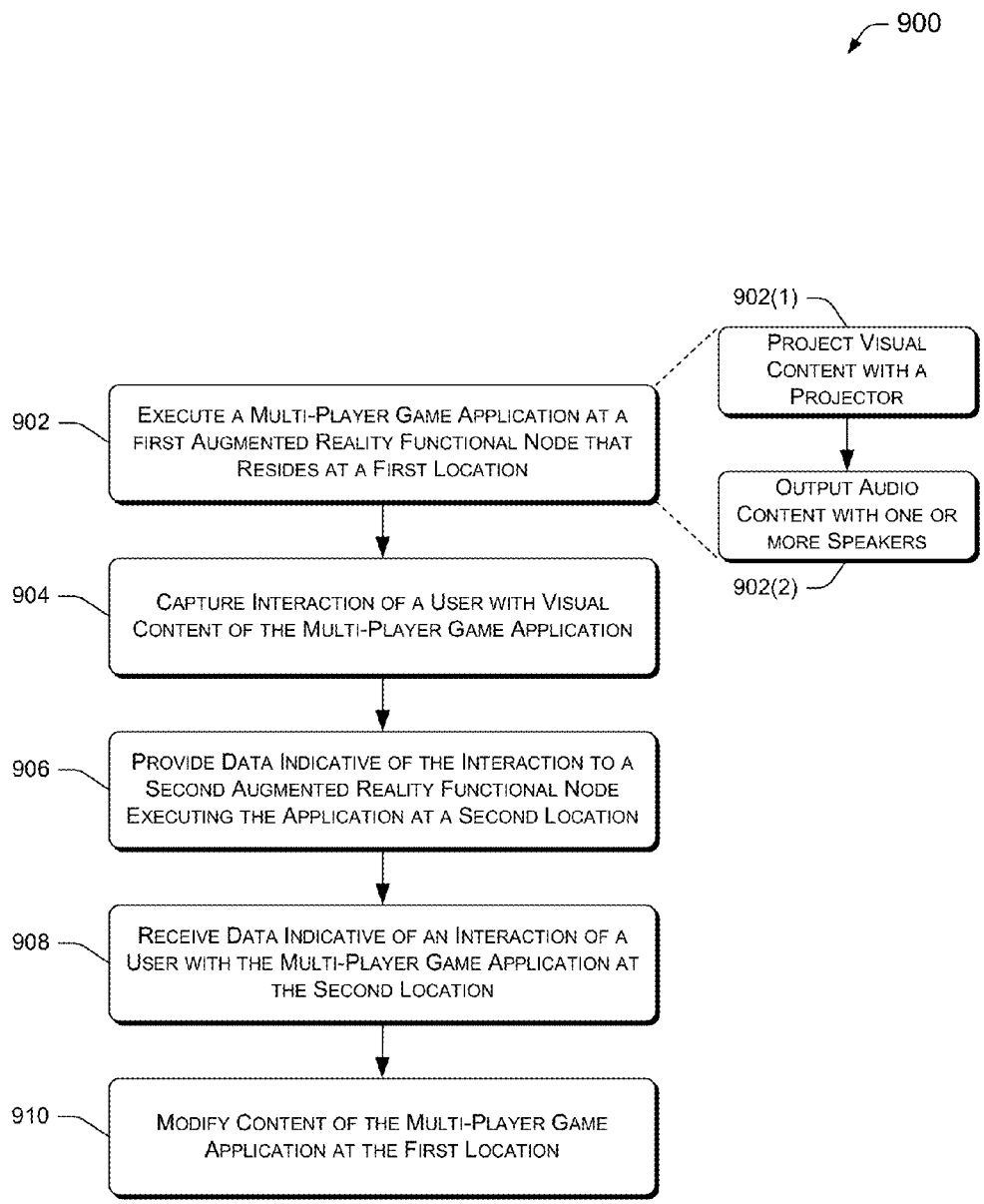
FIG. 9 shows an illustrative process for executing a multi-player game application at two or more different locations.

FIG. 9 shows an illustrative process 900 for executing a multi-player game application at two or more different locations. At 902, one or more first ARFNs execute a multi-player game application at a first location. This may include, at 902(1), projecting visual content of the multi-player game with use of a projector, as well as outputting audio content with use of one or more speakers at 902(2).

At 904, the one or more first ARFNs capture an interaction of a user with visual content of the multi-player game. For instance, a camera of the one or more first ARFNs may capture a user within the first location interacting with projected images as part of playing the multi-player game. At 906, the one or more first ARFNs provide data indicative of this interaction to one or more second ARFNs executing the multi-player game at second location. With use of this data, the one or more second ARFNs may modify output (e.g., audio content, visual content, etc.) of the multi-player game at the second location. That is, the content of the game that the one or more second ARFNs output at the second location may change based on the behavior of the user playing the game at the first location.

At 908, meanwhile, the one or more first ARFNs receive data indicative of an interaction between a user and the multi-player game being executed at the second location. In response, at 910, the one or more first ARFNs may modify content of the multi-player game at the first location. For instance, and as described immediately above, the content of the game that the one or more first ARFNs output at the first location may change based on the behavior of the user playing the game at the second location.

Figure 10:
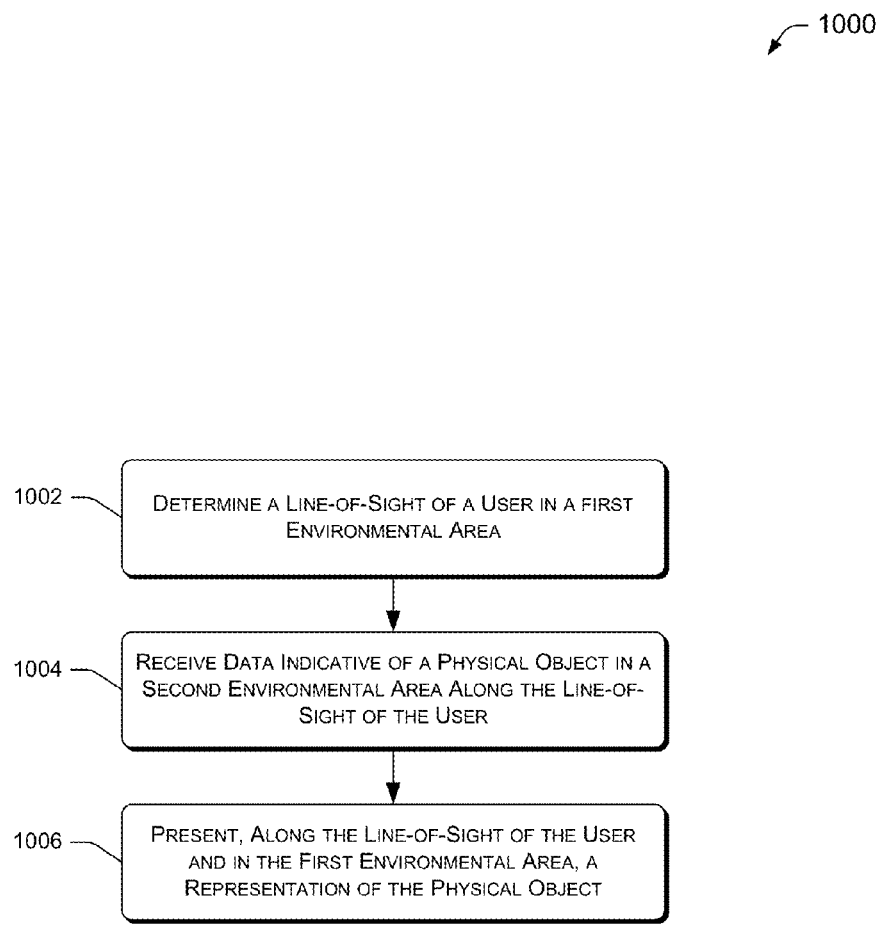
FIG. 10 shows an illustrative process for presenting, in a first location and along a line-of-sight of a user, a representation of an object that resides in a second location.

FIG. 10 shows an illustrative process 1000 for presenting, in a first location and along a line-of-sight of a user, a representation of an object that resides in a second location. At 1002, one or more first ARFNs residing in a first environmental area determine a line-of-sight of a user in the first environmental area. For instance, a camera of the ARFNs may capture information for identifying an orientation of a head of the user, thus allowing determination of the line-of-sight of that user.

At 1004, the one or more first ARFNs may receive data indicative of a physical object that resides within a second environmental area along the line-of-sight of the user, with this data having been acquired from one or more second ARFNs residing in the second environmental area. In some instances, the one or more first ARFNs request this data in response to the user providing a request for the data, such as via a voice command, a visual gesture, or the like.

At 1006, the one or more first ARFNs may present, along the line-of-sight of the user and in the first environmental area, a representation of the physical object based at least in part on the data. For instance, the one or more first ARFNs may project a representation of the physical object on a wall in the first environmental area that is along the line-of-sight of the user.

Figure 11:
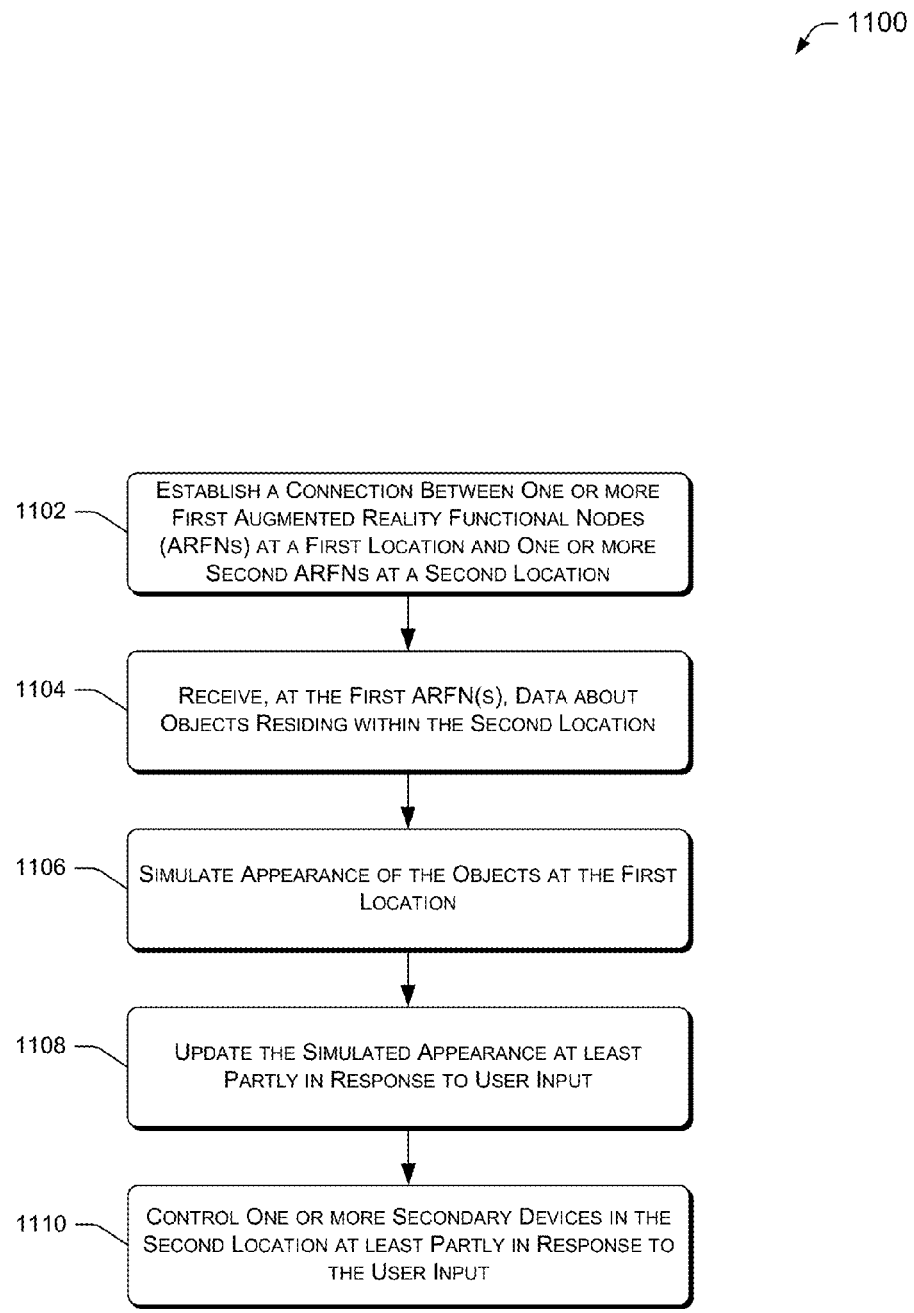
FIG. 11 shows an illustrative process for simulating, in a first location, an appearance of objects that reside in a second location and updating the simulated appearance based at least in part on user input.

FIG. 11 shows an illustrative process 1100 for simulating, in a first location, objects that reside in a second location and updating the simulation based at least in part on user input. At 1102, one or more first ARFNs at a first location establish a connection between one or more second ARFNs at a second location. At 1104, the one or more first ARFNs receive data about objects residing within the second location.

At 1106, the one or more first ARFNs simulate appearance of the objects at the first location with use of the received data. For instance, the ARFN in the hotel room of FIG. 7 may simulate, in the hotel room, the appearance of objects that physically reside at a user's home. At 1108, the one or more AFNS update the simulated appearance at least partly in response to user input. For instance, if a user performs a gesture of turning off a projected light switch, the ARFN(s) may update the appearance of the light switch in accordance with this gesture. Finally, at 1110, the one or more first ARFNs may control one or more secondary devices in response to this user input. For instance, the ARFN(s) may send a request to the one or more second ARFNs to turn off the light at the second location in response to the user's gesture.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
multiple augmented reality functional nodes located in separate locations, each of the multiple augmented reality functional nodes having a projector and a camera for use in generating an augmented reality environment within a corresponding location, the projector projecting one or more images onto surfaces of one or more objects within the aug- mented reality environment and the camera capturing the one or more images projected onto the surfaces of the one or more objects; and a computing system to facilitate communication among the multiple augmented reality functional nodes, such that a first of the multiple augmented reality functional nodes at a first location of the separate locations is configured to:
  receive a plurality of images captured by a second of the multiple augmented reality functional nodes at a second location of the separate locations, wherein one or more of the plurality of images depict one or more objects at the second location,
  identify a subset of the plurality of images that depict one or more objects at the second location that are not duplicative of one or more physical objects at the first location, and
  project, at the first location, the subset of the plurality of images using the projector of the first augmented reality functional node located at the first location.

2. The system of claim 1, wherein each of the augmented reality functional nodes generates an augmented reality environment at least partly through use of structured light, light detection and ranging (LIDAR), optical time-of-flight, ultrasonic ranging, stereoscopic imaging, or radar.

3. The system of claim 1, wherein the computing system comprises computer devices associated with corresponding augmented reality functional nodes, the computer devices communicating with one another over a network.

4. The system of claim 1, wherein the computing system comprises a remote computing system having processors and data storage separate from the augmented reality environments created by the augmented reality functional nodes, the remote computing system collecting data from one or more of the augmented reality functional nodes and distributing the data to others of the augmented reality functional nodes.

5. The system of claim 1, wherein the computing system is configured to execute a game application to enable users in multiple different augmented reality environments to participate in playing a common game.

6. A method comprising:
creating a first augmented reality environment at a first location using one or more first augmented reality functional nodes, the one or more first augmented reality functional nodes including at least one projector and at least one camera and the creating of the first augmented reality environment comprising:
  projecting one or more images onto surfaces of one or more objects within the first location with use of the at least one projector; and
  capturing, with use of the at least one camera, the one or more images;
receiving data from one or more second augmented reality functional nodes used to create a second augmented reality environment at a second location, the data comprising a plurality of images captured by the one or more second augmented reality functional nodes at the second location, wherein one or more of the plurality of images depict one or more objects at the second location;
identifying a subset of the plurality of images that depict one or more objects at the second location that are not duplicative of one or more physical objects at the first location; and
using the subset of the plurality of images to modify the first augmented reality environment.

7. The method of claim 6, wherein creating the first augmented reality environment further comprises projecting structured light within the first location.

8. The method of claim 6, wherein the data comprises images captured by at least one camera of the one or more second augmented reality functional nodes.

9. The method of claim 6, wherein the data comprises audio captured by at least one microphone of the one or more second augmented reality functional nodes, and further comprising:
outputting the audio with use of the one or more first augmented reality functional nodes at the first location.

10. The method of claim 6, wherein receiving data from one or more second augmented reality functional nodes comprises directly communicating from the one or more first augmented reality functional nodes with the one or more second augmented reality functional nodes.

11. The method of claim 6, wherein receiving data from one or more second augmented reality functional nodes comprises providing a request for the data to a central computing resource configured to receive the data from the one or more second augmented reality functional nodes.

12. A method comprising:
receiving, by one or more first augmented reality functional nodes at a first location, a plurality of images captured by one or more second augmented reality functional nodes at a second location that is remote from the first location, wherein one or more of the plurality of images depict one or more objects at the second location;
identifying a subset of the plurality of images that depict one or more objects at the second location that are not duplicative of one or more physical objects at the first location; and
projecting, at the first location, the subset of the plurality of images using the one or more first augmented reality functional nodes.

13. The method of claim 12, further comprising:
creating a first augmented reality environment at the first location using the one or more first augmented reality functional nodes, the one or more first augmented reality functional nodes including at least one projector and at least one camera, and the creating of the first augmented reality environment comprising:
  projecting one or more images onto surfaces of one or more objects within the first location with use of the at least one projector, and
  capturing, with use of the at least one camera, the one or more images.

14. The method of claim 13, wherein creating the first augmented reality environment further comprises projecting structured light within the first location.

15. The method of claim 13, wherein creating the first augmented reality environment further comprises using light detection and ranging (LIDAR), optical time-of-flight, ultrasonic ranging, stereoscopic imaging, or radar.

16. The method of claim 12, wherein the plurality of images comprises images captured by at least one camera of the one or more second augmented reality functional nodes.

17. The method of claim 12, further comprising outputting, by the one or more first augmented reality functional nodes at the first location, audio captured by at least one microphone of the one or more second augmented reality functional nodes.

18. The method of claim 12, wherein receiving the plurality of images comprises directly communicating from the one or more first augmented reality functional nodes with the one or more second augmented reality functional nodes.

19. The method of claim 12, further comprising providing, by the one or more first augmented reality functional nodes, a request for the plurality of images to a central computing resource configured to receive the plurality of images from the one or more second augmented reality functional nodes.

20. One or more non-transitory computer-readable media storing computer-executable instructions that, when executed, cause one or more processors to perform acts comprising:

receiving a plurality of images from at least one augmented reality functional node at a remote location, wherein one or more of the plurality of images depict one or more objects at the remote location;

identifying a subset of the plurality of images that depict one or more objects at the remote location that are not duplicative of one or more physical objects at a first location corresponding to the one or more non-transitory computer-readable media; and projecting the subset of the plurality of images.

* * * * *